United States Patent [19]
Fee et al.

[11] Patent Number: 5,956,165
[45] Date of Patent: Sep. 21, 1999

[54] METHOD AND APPARATUS FOR UPDATING SUBCARRIER MODULATION IN A COMMUNICATION NETWORK

[75] Inventors: John A. Fee; Frank A. McKiel, Jr., both of Plano, Tex.

[73] Assignee: MCI Communications Corporation, Washington, D.C.

[21] Appl. No.: 08/928,426

[22] Filed: Sep. 12, 1997

[51] Int. Cl.$^6$ .............................. H04B 10/20; H04J 14/00
[52] U.S. Cl. ........................................... 359/118; 359/136
[58] Field of Search ..................................... 359/118, 125, 359/127, 136, 137, 157; 385/24; 370/335, 320

[56] References Cited

U.S. PATENT DOCUMENTS

| | | | |
|---|---|---|---|
| 5,068,888 | 11/1991 | Scherk et al. | 379/100.11 |
| 5,479,286 | 12/1995 | Stalley et al. | 359/125 |
| 5,488,501 | 1/1996 | Barnsley | 359/137 |
| 5,541,927 | 7/1996 | Kristol et al. | 370/94.2 |
| 5,561,670 | 10/1996 | Hoffert et al. | 370/94.1 |
| 5,590,181 | 12/1996 | Hogan et al. | 379/114 |
| 5,646,982 | 7/1997 | Hogan et al. | 379/89 |
| 5,726,783 | 3/1998 | Cooper et al. | 359/125 |

OTHER PUBLICATIONS

Computer Telephony, CT and the 'Net, Mar. 1996, pp. 219–221.
tele.com, Internet Telephony, Jun. 1996, pp. 68–72.
Newton, The Personal Side of CT, Jan. 1997, pp. 12, 14.
Retkwa, Telephone Politics, Jun. 1996, pp. 54–60.
Kim, Talk is Cheap, Jul. 1996, pp. 34–39.
Platt, Why Iso Ethernet Will Change the Voice and Video Worlds, Apr. 1996, pp. 55–59.
Margulies, CT's Cyberdate With The 'Net, Aug. 1996, pp. 28–29.
Telephony on the Internet Workshop Information.
Bethony, HAHTSite Gives Pros Everything They Need, Mar. 1997, pp. 36–37.
'Net Telephony Spec Recommended, Mar. 1997, pp. 12–13.
Civanlar et al., FusionNet: Joining the Internet & Phone Networks for Multimedia Applications, 1996, pp. 431–432.
Serrano, Evolution of a Hybrid Fibre Coaxial Network for Multimedia Interactive Services, Oct. 1996, pp. 249–253.
Hurwicz, Faster, Smarter Nets, Apr. 1997, pp. 83–89.
Internet By Satellite.
Low, Web IN–An Architecture for FAst Deployment of IN–based Personal Services, Apr. 1996, vol. 1.
The Intelligent Web, Apr. 1996, vol. 2.
Grami, et al., The Role Of Satellites In The Information Superhighway, Jun. 1995, pp. 1577–1581.
Chen et al., ATM and Satellite Distrubution of Multimedia Educational Courseware, Jun. 1996, pp. 1133–1137.
Sunaga et al., A Reliable Communication Switching Platform for Quick Service Provisioning, Feb. 1995, pp. 77–82.
Tsuchida et al., Intelligent Dynamic Service Provisioning Architecture in the Multimedia Era, Apr. 1996, pp. 1117–1122.

(List continued on next page.)

Primary Examiner—Kinfe-Michael Negash

[57] ABSTRACT

A system, method and apparatus are described that allow for the updating and transmittal of a low data rate signal providing ancillary network data as a rider on a high data rate optical signal. This subcarrier modulated signal can be processed and updated by using a drop/insert facility without having to alter the high data rate signal component of the data signal. Since the subcarrier signal can be detected by inexpensive equipment without having to detect and demultiplex the high data rate signal, the approach described offers a cost effective solution to the problem of network monitoring. Ancillary network management information can be communicated regardless of the quality or loss of the high data rate signal. In addition, by updating the subcarrier signal rider in a cumulative manner, a complete history of the fiber link the modulated optical signal travels on is provided to network management.

36 Claims, 10 Drawing Sheets

OTHER PUBLICATIONS

Schreyer et al., Least Cost Call Routing, Apr. 1996, pp. 12–.
Jain, Evolving Existing Narrowband Networks Towards Broadband Networks with IN Capabilities, Apr. 1996.
Gupta et al., Technical Assessment of (T)INA–TMN–OSI Technology For Service Management Applications, Feb. 1994, pp. 877–887.
Ejiri, For Whom The Advancing Service/Network Management, Feb. 1994, pp. 422–433.
Ely, The Service Control Point as a Cross Network Integrator, Apr. 1996, pp. 1–8.
Perret et al., MAP: Mobile Assistant Programming for Large Scale Communications Networks, Apr. 1996, pp. 1128–1132.
Cobbold et al, Enhancements for Integrated Wireless Personal Communciations over Metropolitan Area Networks, Apr. 1996, pp. 1370–1376.
Sclavos et al., Information Model: From Abstraction to Application, Feb. 1994, pp. 183–195.
Aidarous et al., The Role Of The Element Management Layer In Network Management, Feb. 1994, pp. 59–69.
Inamori et al., Applying TMN to a Distributed Communications Node System with Common Platform Software, Feb. 1995, pp. 83–87.
Kolarov et al., End–to–end Adaptive Rate Based Congestion Control Scheme for ABR Service in Wide Area ATM Networks, Feb. 1995, pp. 138–143.
Duan et al., Efficient Utilization of Multiple channels between two Switches in ATM Networks, Feb. 1995, pp. 1906–1911.
Kishimoto, Agent communication system for multimedia communication services, Mar. 1996, pp. 10–17.
Elia et al., Skyplex: Distributed Up–link for Digital Television via Satellite, Dec. 1996, pp. 305–313.
Kelly, Mountaintop office keeps skiers in touch, USA Today, vol. 15 No. 112.
Macedonia, et al., Mbone Provides Audi and Video Across the Internet, Apr. 1994.
Kumar, Internet Multicasting: Internet's Next Big Thing, Jan. 1996.
Schulzrinne et al., RFC 1889–RPT: A Transport Protocol For Real–Time Applications, Jan. 1996.
Schulzrinne et al., RFC 1890–RPT Profile for Audio and Visual Conferences With Minimal Control, Jan. 1996.
Eriksson, MBone: The Multicast Backbone, Aug. 1994.
Sullivan, Videoconferencing Arrives on the Internet, Aug. 1996.
Kahn, Videoconferencing Debuts on the Internet, Feb. 1995.

METHOD AND APPARATUS FOR UPDATING SUBCARRIER MODULATION IN A COMMUNICATION NETWORK

RELATED APPLICATIONS

This patent application is related to the following commonly owned applications:

1. "Method and System for Detecting Link Failure in All Optical Communication Network," Ser. No. 08/582,845, by John A. Fee, filed on Dec. 29, 1995, and incorporated herein by reference;

2. "All Optical Network with Low Level Subcarrier for Ancillary Data," Ser. No. 08/673,651, by John A. Fee, filed on Jun. 28, 1996, and incorporated herein by reference; and 3. "System and Method for Photonic facility and Line Protection Using Wavelength Switching," Ser. No. 08/672,808, by John A. Fee, filed on Jun. 28, 1996, and incorporated herein by reference.

BACKGROUND OF THE INVENTION

This invention relates generally to updating modulated data signals in an optical network. Specifically, this invention relates to updating a modulated optical data signal having high data rate signal and subcarrier signal components by superimposing an updated subcarrier signal onto the modulated optical data signal. A drop/insert facility is utilized to create the updated optical signal without having to alter the high data rate signal component of the modulated optical data signal.

2. Related Art

A typical communication network, serving to transport information among a number of locations, consists of various physical sites, called nodes, interconnected by information conduits, called "links." Each link serves to carry information from one site to another site. Individual sites contain equipment for combining, separating, transforming, conditioning, and/or routing data.

FIG. 1 shows an example typical communications network 100 consisting of sites 101–105 connected by links 120–121. Links are generally implemented using electrical cables, satellites, radio or microwave signals, or optical connections and can stretch for tens or hundreds of miles between sites. Through these links, the communications network 100 carries data signals among the sites 101–105 to effectively interconnect data remote equipments 111–115, i.e., computers, remote terminals, servers, etc. One or more links 120 and 121 that connect two sites are collectively referred to as a span 130. These sites 101–105 normally contain at least one cross-connect switch (either electrical or optical) and are in constant communication with a central network management system facility 140 which monitors the flow of traffic throughout the network.

Optical networks that include a plurality of optical transmission lines or links permit high bandwidth data communications, and may be used in telephone and other data network systems. High speed data can be modulated on light waves which are transmitted through the optical network. The optical transmission line, connecting an optical transmitter and receiver, can propagate many light wave signals of different frequencies simultaneously. Thus, fiber optic communications links carry vast amounts of information among distant sites to accomplish data, voice and image connectivity over a large geographical area.

The traffic of even a single link represents a formidable volume of vital data, equivalent to tens of thousands of phone calls. Sudden failure of a data link can cause a significant loss in revenues for a network owner and loss of commerce and other benefits for the network subscribers. Consequently, restoration techniques have been devised to quickly circumvent network link failures and restore normal traffic flow.

Thus, a primary concern for network providers is that with the substantial volume of data traffic and re-routing techniques performed as a result of restoration events, it has become increasingly important to accurately track and "label" optical data streams traveling through various portions of the network.

SUMMARY OF THE INVENTION

The present invention provides a method, apparatus and system for updating the ancillary network data contained in a modulated optical data signal. The modulated optical data signal comprises a high data rate modulation signal, e.g. a SONET signal, and a subcarrier modulation signal, typically a low data rate signal that contains network management information. This subcarrier modulation signal provides ancillary network data as a rider on the high data rate optical signal. The system includes a communication network that facilitates the transport of modulated optical data signals. Additionally, first and second sites are connected by a first fiber link carrying the modulated optical data signal between the first and second sites. The second site can further include an add/drop multiplexer (ADM) or an intermediate optical cross-connect switch for optically coupling the modulated optical data signal between the first fiber link to a second fiber link.

According to a first embodiment of the present invention, the modulated optical data signal is updated by a drop/insert facility. A small portion of the modulated optical data signal from the first fiber link is optically coupled into the drop/insert facility. This coupled portion is then processed by the drop/insert facility, where the subcarrier component of the modulated optical data is converted into an electrical signal representation of the subcarrier component. An amplified portion of this electrical signal is sent to a local control unit located in the drop/insert facility and the remainder of the amplified electrical signal is inverted. The drop/insert facility sends a driving signal corresponding to the inverted subcarrier signal component and an updated subcarrier signal generated by the drop/insert facility to an optical amplifier. The remaining portion of the modulated optical data signal is amplified by an optical amplifier, thus updating the modulated data signal. The network management information contained in the updated subcarrier signal is superimposed onto the modulated optical data signal and the original subcarrier signal component is subtracted from the modulated optical data signal by the inverted subcarrier driving signal. The updated optical signal then enters the optical cross-connect switch with the updated subcarrier component.

In particular, the drop/insert facility comprises several elements that facilitate the updating of the modulated optical data signal. First, the drop/insert facility includes an optical processor which processes the subcarrier modulation signal component of the coupled portion of the modulated optical data signal in order to generate a first electrical signal representative. An amplifier then amplifies this first electrical signal representative. Further, a subcarrier receiver receives a tapped portion of the amplified signal. An inverter, receiving the remaining portion of the amplified signal, creates the inverted electrical signal representation of the subcarrier component of the modulated optical data signal from the first fiber link.

The drop/insert facility also includes a local control unit in electrical communication with the subcarrier receiver. The local control unit acts to control the functioning of the drop/insert facility. The local control unit comprises a data receive buffer that receives subcarrier information from the subcarrier receiver, a data transmit buffer, and a processor to process signal information and subcarrier information. The local control unit operates by placing updated signal status information concerning the modulated optical data signal from the first fiber link onto the data transmit buffer. Next, the signal from the data transmit buffer is sent to a new subcarrier transmitter, which generates an updated subcarrier signal. This updated signal acts in combination with the inverted subcarrier component signal generated by the inverter to drive the optical amplifier, thereby updating the modulated optical data signal from the first fiber link. The local control unit can also be in electrical communication with a network management system that provides network signal status info.

A second embodiment of the present invention provides for specifically incorporating new wavelength status information onto the modulated optical data signal. Specifically, the present invention includes a wavelength shifter, in electronic communication with the network management system and the drop/insert facility, and optically coupled to the first fiber link, to shift the wavelength of the modulated optical data signal.

Another embodiment of the present invention provides for an optical path trace of a modulated optical data signal traveling through the network. Each site is equipped with a drop/insert facility capable of generating and placing current ancillary network information in the form of a subcarrier modulation signal onto the modulated optical data signal passing through that site. The subcarrier modulation signal traveling from a first site to a second site comprises a plurality of subcarrier modulation bands (or FDM slots). A first FDM slot corresponds to ancillary network data input at a first subcarrier frequency at the first site and a second FDM slot corresponds to ancillary network data input at a second subcarrier frequency at the second site. The ancillary network data generated at each site can include a unique network element identifier. Using FDM techniques, the subcarrier modulation signal can be added onto at each network element along the optical path. Thus, a cumulative history of a network link can be retrieved at a destination site by detecting and demodulating the subcarrier signal component of the modulated optical data signal.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

Figure 1:
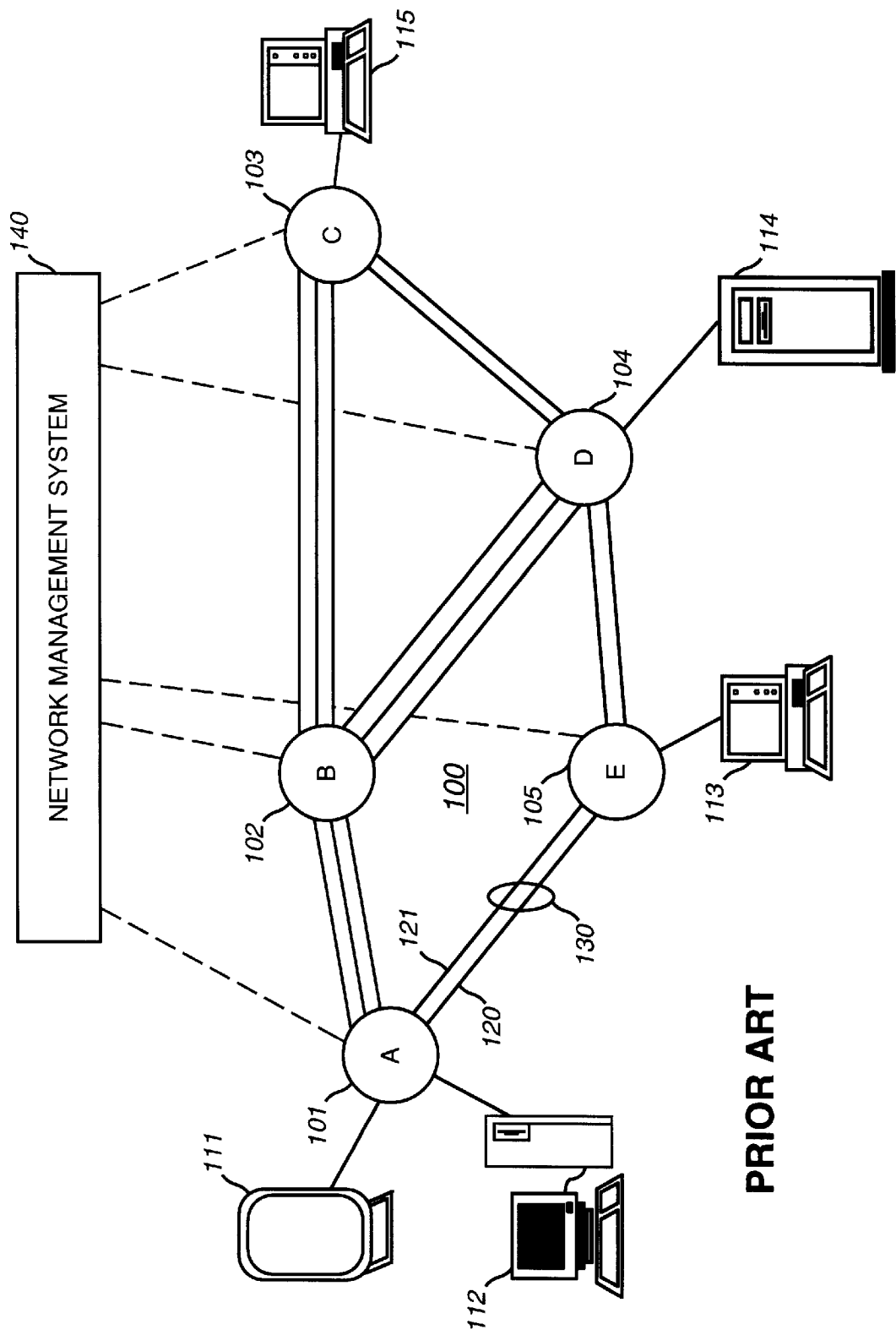
FIG. 1 is a block diagram of a typical communications network.

1. Overview and Discussion of the Invention

Optical networks carry high data rate traffic supporting an ever-increasing variety and range of interconnected data networks, lower-level networks, distributed systems, consumer communication products and services, and remote units. As the proliferation and diversity of network elements and signals becomes greater, the management of the multitude of data signals traveling along the network becomes even more critical. At the same time, however, it is desirable to keep costs at a practical level.

The present invention allows for the reception and transmittal of a low data rate signal (or subcarrier modulation signal) providing ancillary network data as a rider on a high data rate optical signal. By utilizing this subcarrier modulation scheme to transmit ancillary network data, the optical carrier signal can remain in the optical domain throughout the multiple switching sites, add/drop multiplexers (ADMs), wavelength routers, and amplifying stages located in the network. Thus, multiple conversions of the high data rate signal from the optical domain to the electrical domain and back into the optical domain are avoided. In addition, the present invention further provides network management with the capability of adding individual network location information onto the subcarrier modulation signal without having to convert the optical carrier signal back into the electrical domain as the optical carrier signal passes through each network element. Thus, a network destination can receive a cumulative trace of the path of the optical signal simply by detecting and demodulating the subcarrier modulation signal.

2. Terminology

According to the present invention, this subcarrier modulated signal can be processed and updated by using a drop/insert facility located along a fiber link. The term "update" generally refers to the step or function of altering or modifying the subcarrier modulation signal to insure that its data content accurately reflects the optical carrier signal's status, e.g., its specific location in the optical network. In particular, the term "update" can refer to overwriting or replacing entirely the content of the subcarrier modulation signal. Alternatively, "update" can refer to selectively modifying a portion of the subcarrier modulation signal. In addition, "updating" can also refer to appending to or altering the length of the information originally contained on the subcarrier modulation signal.

The name "drop/insert" refers to the facility's capability to drop and insert subcarrier signals onto an optical carrier signal traveling through the network without having to alter the high data rate signal component of the optical carrier signal. In particular, the term "drop" refers to the ability to provide an access point for receiving an incoming subcarrier signal. Further, the term "insert" refers to the ability to provide an access point for delivery of a subcarrier signal along an outgoing line.

Thus, a main advantage of the present invention is that both the "drop" and "insert" functions can be performed without having to convert the high data rate optical signal back into the electrical domain. Since the subcarrier modulation signal can be detected by inexpensive equipment without having to detect and de-multiplex the high data rate signal, the present invention offers a cost effective solution to the problem. Ancillary network management information can be communicated regardless of the quality or loss of the high data rate signal as long as the optical carrier persists. The manner in which this is accomplished is described in detail below.

3. Example Environment

Before describing the invention in great detail, it is useful to describe an example environment in which the invention can be implemented. In the broadest sense, the invention can be implemented in any optical communication network that utilizes subcarrier signals to transport ancillary network data.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

Figure 2:
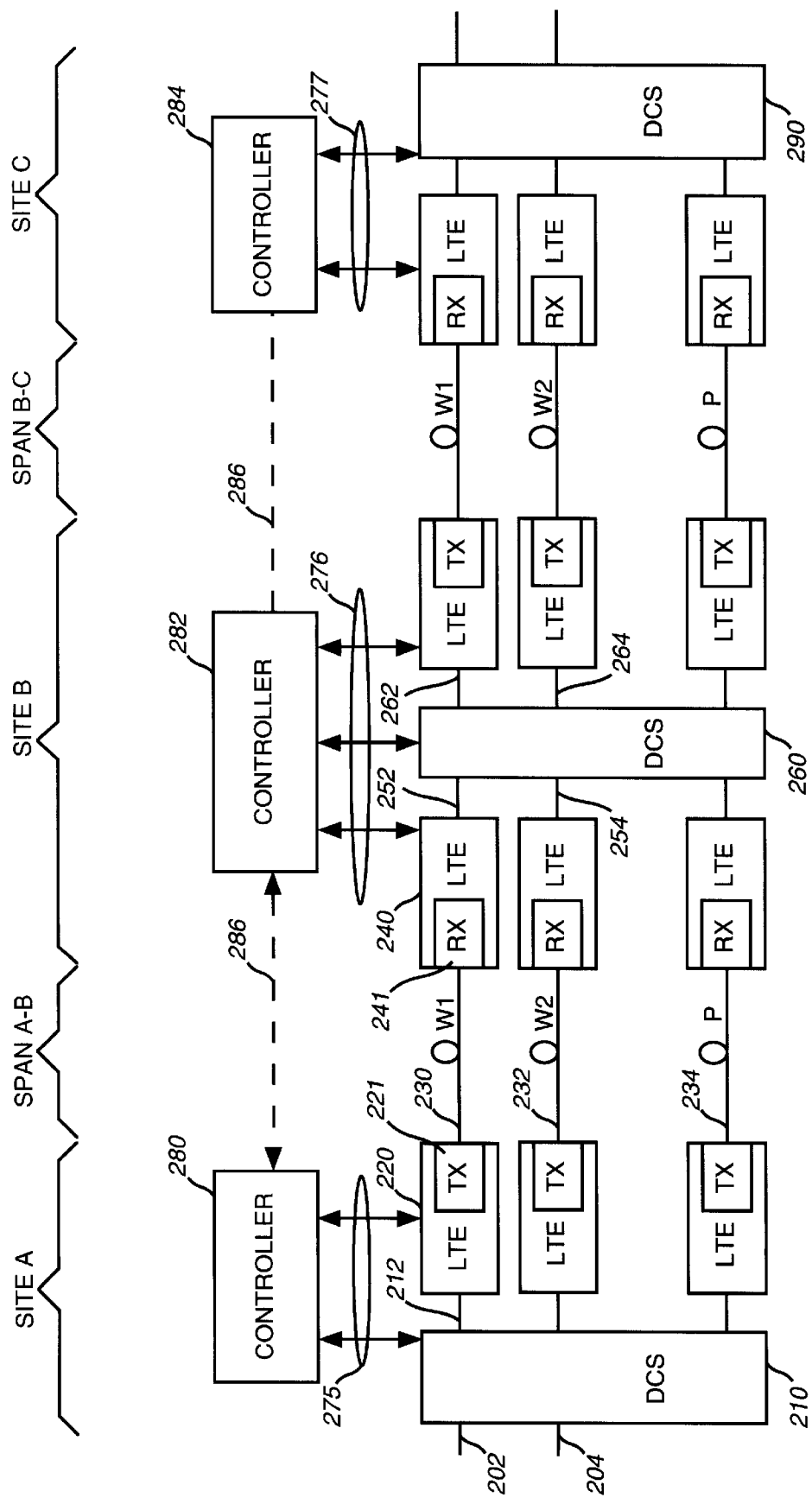
FIG. 2 is a block diagram of the electrical and optical components employed in an optical data communications span.
Figure 3:
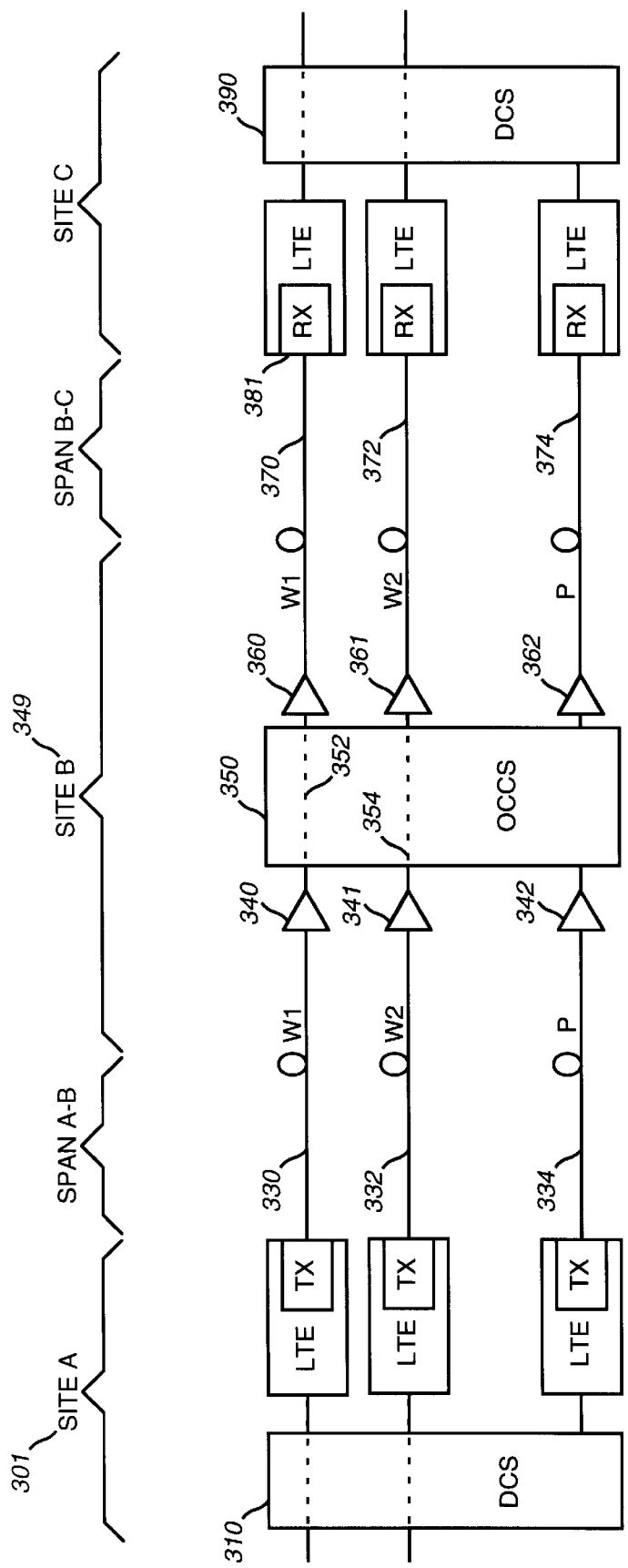
FIG. 3 illustrates a portion of an optical network showing the role of an intermediate optical cross-connect switch.

Example implementations of high data rate optical spans are depicted in FIGS. 2 and 3. In FIG. 2, a given site A is connected to another site B by a span consisting of three optical fibers 230, 232, 234. Two electrical data signals are presented at Site A via inputs 202 and 204. These signals are converted into optical representations at site A. These signals are then carried through the network span and recovered at Site B as electrical signal outputs 262 and 264 respectively. For example, these data signals can be SONET-compliant STS-48 synchronous data signals each bearing digital data at about 2.5 Gbps or the equivalent of 32 thousand telephone-quality voice channels.

For example, at Site A, a signal enters a digital cross-connect switch 210, and under normal conditions appears as an electrical signal. The signal enters optical Lightwave or Line Terminal Equipment (LTE) 220 shown to include an optical transmitter 221, such as a semiconductor laser. Light emitted by the transmitter 221 is intensity-modulated by the electrical data signal that enters along connection 212 to deliver a modulated optical output signal over optical fiber 230.

After traversing the length of fiber 230, the optical signal arrives at Site B and enters a receiver 241 such as a photodiode. The receiver 241 is shown to be a part of an LTE 240 that amplifies and conditions the signal to render a faithful electrical reproduction at output port 252 of the original electrical data signal provided at input 202. In a similar manner, an electrical data signal presented at input 204 is transported by LTE 222, fiber 232, and LTE 242 to output port 254.

Under normal circumstances, the digital cross-connect switch (DCS) 260 simply connects port 252 to output port 262 to complete the end-to-end connection of input 202 to output 262. Likewise, DCS 260 normally connects line 254 to output 264 to complete the end-to-end connection of input 204 to output 264.

Typically, controllers 280, 282, 284, coordinated with each other over a separate communications link 286, direct the switching action of the DCSs via control connections 275, 276, 277. Each controller is typically an imbedded microprocessor, computer, workstation, or other type of processor for controlling the switching of lightwave terminal equipment, digital cross-connect switches, and optical cross-connect switches.

For example, status messages can be sent to indicate, acknowledge, or confirm a link or node state such as an idle, active, inactive, or detected fault state. Any digital signaling protocol can be used such as X.25, Frame Relay, ATM, B-ISDN or Common Channel Signaling 7 protocols. Alternatively, controllers can communicate status messages using overhead bits or bytes within the data protocol that traverses the optical fibers. Controllers can also apply restoration algorithms and protocols, well known to those skilled in the art, to restore end-to-end connectivity in response to a fault detection.

FIG. 2 also encompasses another span B-C connected to site C. Electrical DCS switches 210, 290 are provided at respective endpoint sites A,C. Traffic between sites A and C travels through an intermediate optical/electronic site B. Spans A-B and B-C interconnect the sites as shown. Thus, FIG. 2 illustrates the practice of performing optical-electrical-optical conversion at each intermediate site.

In contrast, FIG. 3 represents an environment where data signal handling is performed in the optical domain. Compared to conventional optical-electronic switching, spans A-B and B-C are optically interconnected at site B. FIG. 3 shows that an entire set of LTEs and a DCS at site B have been replaced by an optical cross-connect switch (OCCS) 350 and several optical amplifiers 340–342 and 360–362. Alternatively, site B can contain add/drop multiplexers (ADMs). ADMs are used in optical communication networks to receive and inject portions of the high data rate signals and are well known to those skilled in the art. Note that the approach of FIG. 3 requires less equipment and removes the intrinsic data rate limitations imposed by intermediate electrical equipment.

The optical switch 350 is capable of being controlled in the same way as the DCSs. An electrical control signal (or an optical control signal) drives the optical switch to selectively form optical connections among various input and output ports facing optical fibers 330–334, 370–374. For example, internal connections 352 and 354 within the OCCS 350 optically couple respective fibers 330, 332, 370, 372 in both spans A-B, B-C under normal network conditions as shown in FIG. 3. The optical amplifiers 340–342, 360–362 intensify the lightwave signal and compensate for losses introduced by the fibers and OCCS 350.

An all optical network introduces difficulties, such as fault detection and isolation, because signal integrity checks (such as cyclic redundancy check (CRC) and framing) are not inherently monitored in an optical domain. One method of introducing a monitoring mechanism is to add a low level subcarrier to the optical carrier at a transmission site (e.g. site A from FIG. 3) and detect it at a switching node (e.g., site B, from FIG. 3). To better utilize the subcarrier signal, especially in the event of a fiber outage, it is necessary to tag network management information (ancillary data) onto the subcarrier signal. For example, a subcarrier signal containing important network status information (e.g. a data signal's integrity or performance) modulated at or about 1 KHz to 10 MHz can be linearly added to an incident high data rate signal, such as a SONET signal modulated at approximately 10 GHz.

By demodulating the subcarrier signal, the ancillary network data can be recovered at any point along an optical network link. The recovered ancillary network data is useful for a myriad of network applications including, but not limited to, tracing network timing references, cumulative link identification, wavelength re-mapping and re-use, telemetry and transmission performance evaluation, customer data payload identification, operational status indication, and/or other network management operations.

However, in some circumstances, a path alteration due to a fiber outage or a change in wavelength of the modulated optical data signal can necessitate updating the subcarrier modulation signal in order that it contain the correct ancillary data. Further, it is desirable to perform this update without also transducing, altering, or interfering with the original high data rate signal.

4. Discussion of the Invention

Figure 4A:
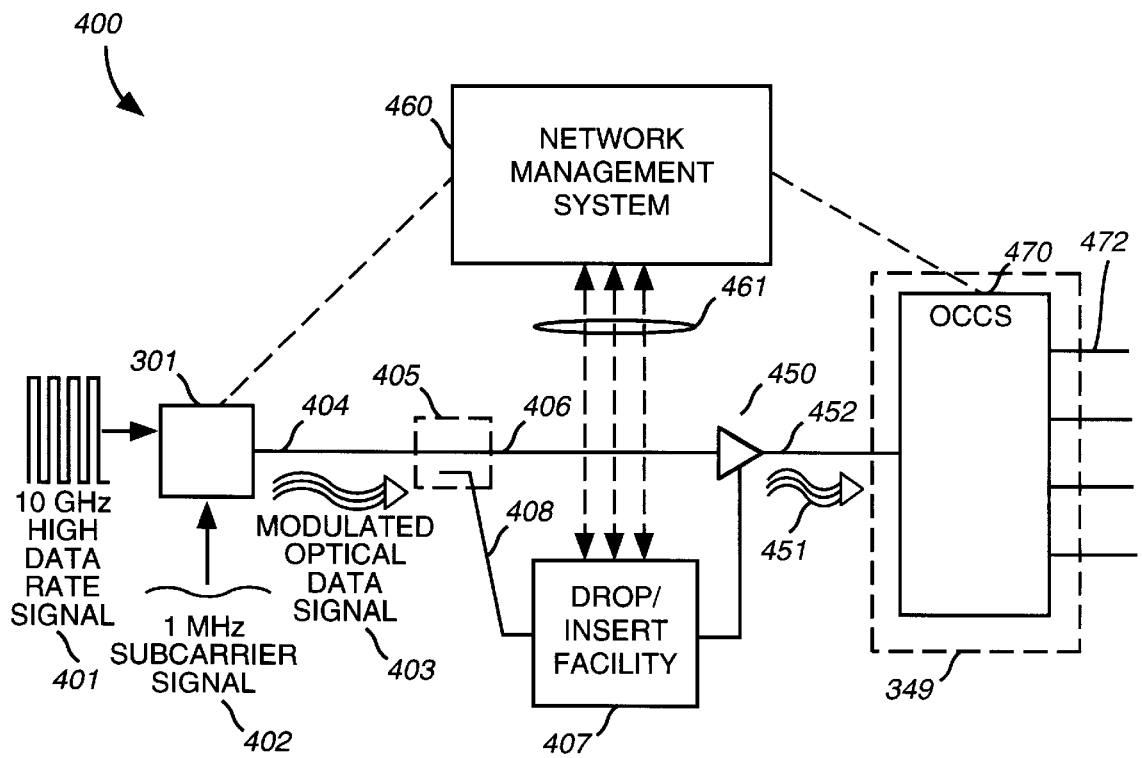
FIGS. 4A–4C illustrate a portion of an optical network showing the role of a drop/insert facility.
Figure 4B:
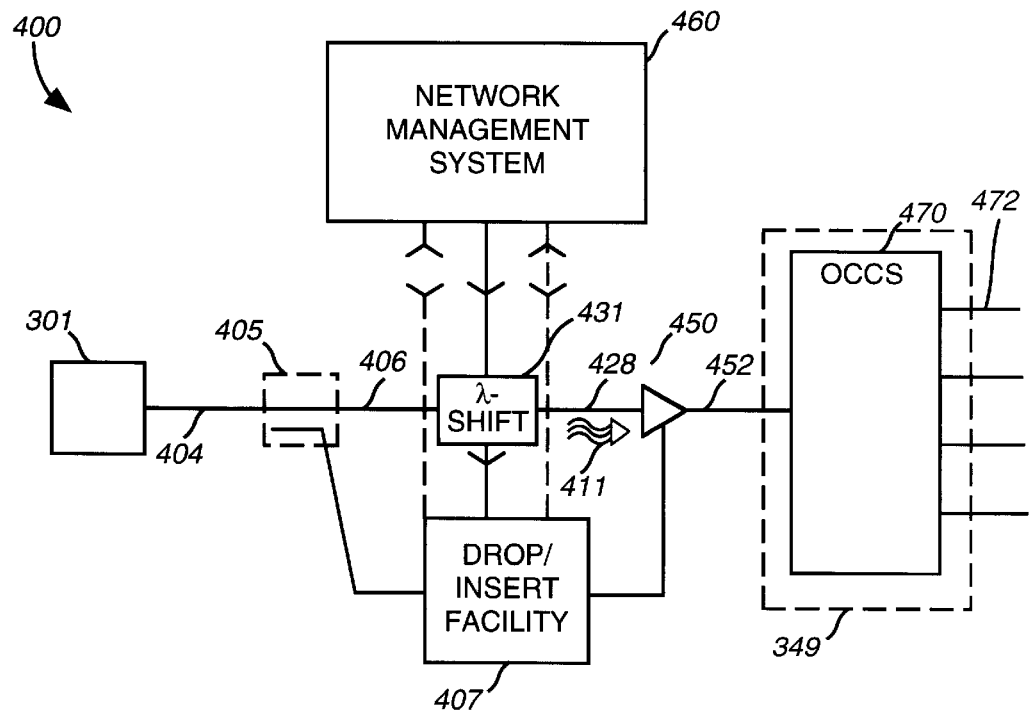
Figure 4C:
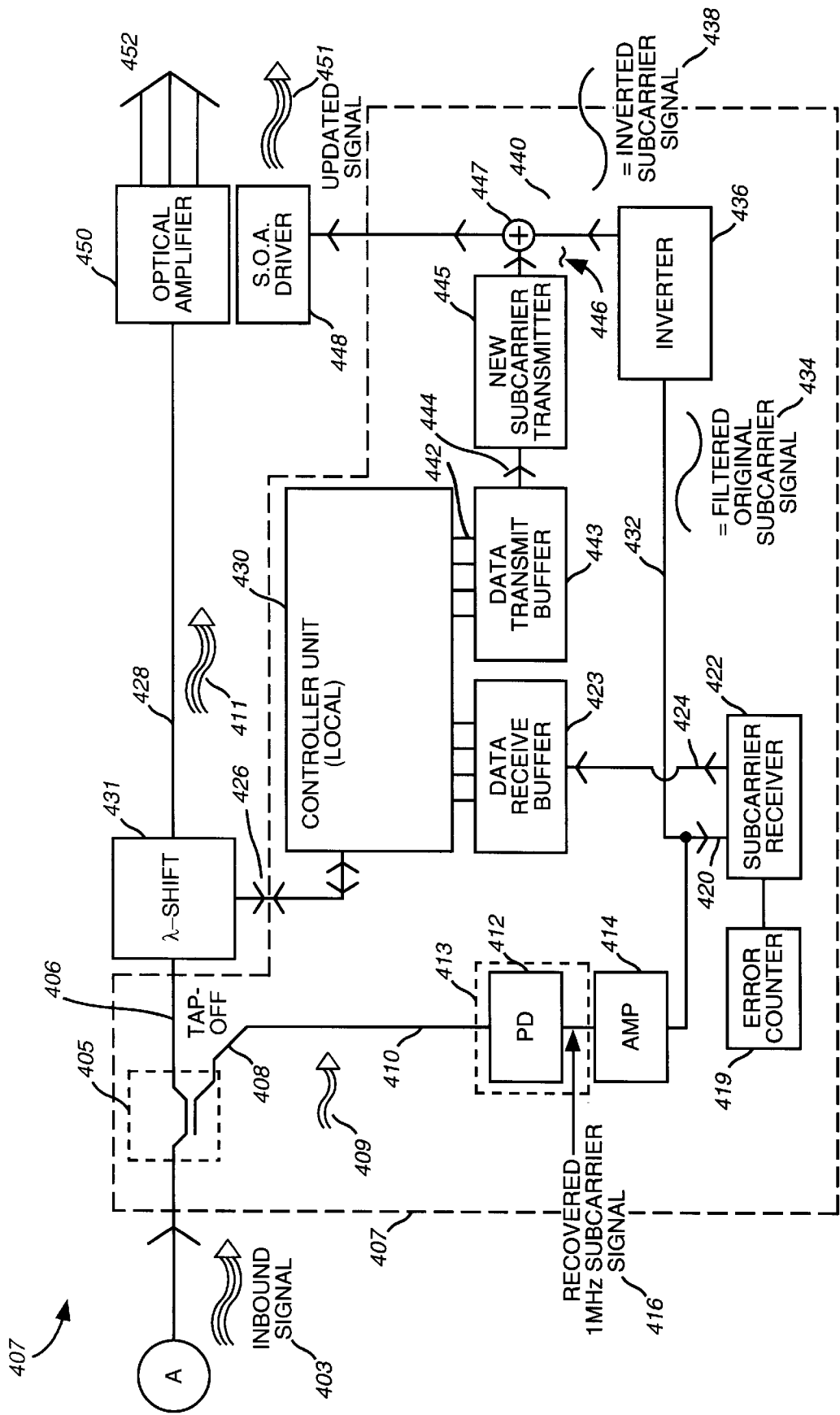

FIGS. 4A–4C are block diagrams of the present invention in an optical network environment. A modulated optical data signal 403 is generated at a site A 301, and travels along a fiber link 404 to a distant site B 349. The present invention provides for a drop/insert facility 407 to generate an updated subcarrier modulation signal with updated ancillary network data to place onto the modulated optical data signal 451 without altering the high data rate signal component 401 of that signal. FIGS. 4B and 4C show a second embodiment of the present invention, which includes the addition of a wavelength shifter 431 placed along optical fiber 406.

a. First Embodiment

FIG. 4A is a block diagram illustrating a portion of an optical network utilizing a drop/insert facility. Fiber link 404 is included in a long-distance span A-B connecting sites A 301 and B 349. Multiple working/and or spare links can be added. For further clarity, only one endpoint site A 301 and an intermediate site B 349 are shown for the network. Additional interconnected sites can be linked through spans to sites A and B as described with respect to FIGS. 1–3 to expand the network. Thus, fiber link 404 constitutes a segment of one or more paths between network endpoint sites. In an all-optical core network, data can be routed, drop/added, or switched optically at intermediate nodes such as site B 349, and injected and recovered from the network in lightwave terminal equipment (LTEs) at the endpoint sites, such as site A 301.

While a more detailed description of the generation of a modulated optical data signal containing high data rate signal and subcarrier signal components is described in "All Optical Network with Low Level Subcarrier for Ancillary Data," Ser. No. 08/673,651, by John A. Fee, filed on Jun. 28, 1996, a brief description is provided here for the reader's convenience. At site A 301, a high data rate signal 401 (e.g., a 1–10 GHz data signal) is presented at an input to a signal combiner (not shown) that is contained within site A 301. In addition, a monitoring subcarrier modulation signal 402 is incident at a second input to the combiner. The linear summation of signals 401 and 402 appear at the output of the combiner and then this composite signal is used to intensity modulate an optical transmitter (not shown), such as a semiconductor laser diode that is contained within site A, to produce an intensity modulated optical data signal, e.g., an Optical Carrier OC-192 signal. In general, any type of high data rate modulated optical source can be used, such as an integrated-type of direct modulated laser or an externally modulated laser, depending upon the required performance, cost, and other known design considerations.

The subcarrier modulation signal 402 is of substantially lower frequency and amplitude than the high data rate signal 401. In a preferred embodiment, the frequency of the superimposed subcarrier modulation signal 402 is several orders of magnitude less than that of the high data rate signal 401. For example, if high data rate signal 401 is on the order of 1 to 10 GHz, i.e. a SONET-compliant STS-48 digital signal (approx. 2.5 GHz) or an STS-192 signal (approx. 9.9 GHz), a useful subcarrier signal 402 may range from 1 KHz to 10 MHz, depending on the response bandwidth of detection equipment used in drop/insert facility 407. Further, the subcarrier signal 402 has a fraction, i.e. one-tenth, of the amplitude of the high data rate signal 401. Other ranges of amplitudes and frequencies for the subcarrier modulation signal 402 and the high data rate signal 401 can be selected. Since high data rate optical receivers located at receiving LTEs have high pass filters, the subcarrier modulation signal is attenuated.

The modulated optical data-signal 403 is transported over fiber link 404 to site B 349. After traveling a considerable distance, the signal may be strengthened by an optical amplifier (not shown) and further sent along fiber 404. Multiple optical amplifiers can be spaced along a fiber link to increase range.

The modulated optical data signal 403 carried through fiber 404 eventually reaches an optical cross-connect switch 470 (OCCS) at a distant site B 349. Because OCCS 470 is located at an intermediate site or node, OCCS 470 can switch optical connections between multiple working and/or spare fibers. Additionally, OCCS 470 can be any type of multi-port optical cross-connect switch. In principle for a N X N OCCS any number of ports, e.g. N=1, 2, 4, 8, 16, 40, 72, 128, or 256, can be switched. Any type of optical switch can be used depending upon the available technology. See, e.g., the integrated lithium niobate directional-coupler type switches discussed by Waynant, R. et al., Eds., *Electro-Optics Handbook*, McGraw-Hill, Inc. U.S.A. (1994), chapter 26, and especially page 26.34 (incorporated herein by reference). Other types of suitable optical switching technology include switches based on a thermo-optic effect in polymer waveguides or silica glass, semiconductor amplification, piezo movement, and integrated indium phosphide.

In addition, while a single OCCS 470 is shown schematically for clarity, multiple discrete switches and couplers can be used to perform equivalent multiple-port optical switching. For example, a set of discrete 1×2 or 2×2 optical switches can used to switch individual signals between working and protect fibers in different spans. Y-couplers and directional couplers can also be used.

According to the present invention, an optical coupler 405 is provided for coupling a portion of the modulated optical data signal from optical fiber 404 through fiber 408 to a drop/insert facility 407. For example, a tapped optical coupler (e.g., 90/10 2×2 asymmetric coupler) can be used to tap a fraction of the optical signal. It is desirable that most of the optical signal continue along fiber 406 to OCCS 470 in order to assure reliable reception at a remote LTE receiver. Although FIGS. 4A and 4B schematically show optical coupler 405 to be separate from drop/insert facility 407, optical coupler 405 can be considered as part of drop/insert facility 407.

In the first embodiment, drop/insert facility 407 receives the coupled portion of the modulated optical data signal 403.

The drop/insert facility 407, shown in detail in FIG. 4C, processes the coupled portion of the modulated optical data signal to produce an updated subcarrier signal with the correct ancillary network data. The drop/insert facility 407 can be in constant communication via connections 461 to a network management system facility 460 that oversees the operation of the entire network and provides drop/insert facility 407 with current ancillary network information. For example, if a restoration event occurs, the network management system facility 460 provides updated transmission line and signal wavelength information to the drop/insert facility 407 in order to trigger facility 407 to update an incoming data signal. The updated subcarrier modulation signal is then superimposed on the remaining portion of the modulated optical data signal 403 at optical amplifier 450. As a result, the data signal traveling along fiber 452 to OCCS 470 consists of the original high data rate signal component 401 and the updated subcarrier signal component generated by the drop/insert facility 407.

It should be noted that while FIGS. 4A–4C show drop/insert facility 407 located prior to OCCS 470, according to the present invention, drop/insert facility 407 can be located at any point along a fiber link. It is preferable to locate drop/insert facility 407 adjacent to or straddling an intermediate OCCS, ADM, or wavelength router because network restoration and re-routing situations can require updating ancillary network information at such sites. Moreover, while it is preferable to initiate and control drop/insert functions from a network management system, such as network management system 460, a further advantage of the present invention is that drop/insert facility 407 can be controlled on a local level, especially when drop/insert facility 407 is located at a remote area of the communication network.

b. Second Embodiment

FIG. 4B displays a block diagram similar to FIG. 4A illustrating a portion of an optical network utilizing a drop insert facility 407 and a wavelength shifter 431. In situations resulting from a restoration event or network maintenance re-routing, it may be necessary to shift the wavelength of a modulated optical data signal if a desired outbound fiber 472 from OCCS 470 is already carrying another modulated optical data signal of the same wavelength as modulated optical data signal 403. Thus, as soon as the wavelength of a modulated optical data signal is changed, it is necessary to change the subcarrier component of that signal for proper network status. However, in situations where modulated optical signal 403 does not carry wavelength information, and the wavelength is shifted, the subcarrier component of modulated optical data signal 403 need not be updated by drop/insert facility 407 to reflect this shift in wavelength.

In order to permit wavelength agility in an optical communications network, a tunable optical transmitter can be used to transmit modulated optical data signals. For example, the tunable source can be a tunable semiconductor diode laser, a wavelength selectable source, a fixed source coupled to a frequency translator, or any other tunable source well known in the art.

In a similar manner as explained above, a portion of a modulated optical data signal 403 is coupled into the drop/insert facility 407 by optical coupler 405. If, for example, the network management system facility 460 determines that a shift in wavelength of signal 403 is necessary, the remaining portion of signal 403 traveling along fiber 406 will be shifted in wavelength by a wavelength shifter 431 prior to entry into OCCS 470. In other situations where a change of wavelength of signal 403 is not required, wavelength shifter 431 will not shift the wavelength of signal 403.

As one traverses an optical communications network, there is a high likelihood that along a given fiber link, many different signals of different corresponding wavelengths will be carried along that fiber link. Thus, in order to ensure proper communication between sites in a network, a wavelength shift can be necessary because signals sent along the same fiber link cannot have the identical corresponding wavelength. This problem is unique to an optical network with optical switching since in the electrical domain a high data rate signal would normally be remodulated anyway at a digital switching site. Thus, if signal 403 has a corresponding wavelength $\lambda_1$ that is already in use along outbound fiber 472, wavelength shifter 431 will shift the wavelength of signal 403 from $\lambda_1$ to $\lambda_2$. The wavelength shifter 431 can be a commercially available wavelength shifting device such as a Bragg device, a passive crystal, or a position tuning material well known to those of ordinary skill in the art.

The present invention employs the drop/insert facility 407 to generate an updated subcarrier modulation signal corresponding to the new wavelength information of the wavelength shifted modulated optical data signal 411 without having to rewrite the contents of the high data rate component. The drop/insert facility 407 can receive updated ancillary network management information from the network management system facility 460 and the wavelength shifter 431. An updated subcarrier modulation signal is then superimposed onto the wavelength-shifted optical data signal 411 that enters the optical amplifier 450 from fiber link 428. The wavelength-shifted signal can then be sent along outbound fiber link 472 to a desired destination site. Additionally, wavelength shifter 431 can be shared between several fiber links, not just fiber link 406.

c. Detailed Description of Drop/Insert Facility

FIG. 4C is a detailed block diagram of the drop/insert facility 407. At coupler 405, a small portion 409 of optical signal 403 is diverted along fiber 408 and enters optical processor 413. This optical processor 413, as shown, comprises a photodetector 412. Because the intent of photodetector 412 is to recover the low frequency subcarrier signal 402 from optical signal 403 and not detect the higher frequency (high data rate) component 401, photodetector 412 may be implemented using inexpensive photodiodes, phototransistors, or passive photoresistive devices. In addition, a low pass filter (not shown) can be placed in optical processor 413. However, photodetector 412 and a low pass filter may be considered combined into a single unit when inexpensive, slow-responding optical detectors are used. Optical processor 413 generates an electrical signal 416 representative of the subcarrier modulation signal component of modulated optical signal 403. Signal 416 is then amplified by an amplifier 414. A portion of this amplified signal is tapped off into a subcarrier receiver 422 along conduit 420. The subcarrier receiver 422 then relays this tapped electrical signal along conduit 424 to a data receive buffer 423, located at a local control unit 430. Additionally, subcarrier receiver 422 can relay this electrical signal to a subcarrier error counter 419. Subcarrier error counter 419 can be used by network management to monitor the bit error rate of subcarrier modulation signal 402.

The local control unit 430 controls the functioning of the drop/insert facility 407 and receives updated network management information from the network management system facility 460 (shown in FIGS. 4A and 4B). Local control unit 430 also comprises a processor unit (not shown) to process network signal information communicated by the network management system 460 and subcarrier information received by data receive buffer 423. Current ancillary network data processed in local control unit 430 is then placed on a data transmit buffer 443, which relays the ancillary information to a new subcarrier transmitter 445 to generate an updated subcarrier modulation signal 446. In addition, local control unit 430 is also designed to function on a local level, without the need for constant communication to network management.

The remaining portion of the amplified electrical signal 434 is directed along conduit 432 to an inverter 436, which, when activated, creates an inverted electrical signal representation 438 of the subcarrier modulation signal 402 of modulated optical data signal 403 from first fiber link 404. This inverted subcarrier modulation signal 438 may be combined with updated subcarrier modulation signal 446 generated by new subcarrier transmitter 445 at a signal combiner 447. The combined signal is then relayed to a driver 448 driving optical amplifier 450. Alternatively, signals 446 and 438 could be directly relayed to the optical amplifier driver 448 without the use of a signal combiner 447.

The optical amplifier 450 optically amplifies data signal 411 (which may be wavelength-shifted by wavelength shifter 431 as explained above) from fiber link 428. Optical amplifier 450 may be a semiconductor amplifier or an erbium-doped fiber amplifier, depending on the frequency of the subcarrier signal. Alternatively, an external modulator can be used in place of optical amplifer 450. For subcarrier signals with frequencies greater than 1 MHz, semiconductor optical amplifiers represent the preferred embodiment of the present invention. Updated subcarrier modulation signal 446 and inverted subcarrier modulation signal 438 form the bias current driving the optical amplifier 450 and are thus superimposed onto data signal 411. Alternative means of externally modulating the gain of an optical amplifier or using coherent techniques known in the art may also be used to create an intensity modulated optical data signal that is modulated with a high data rate signal and a superimposed low level, updated subcarrier modulation signal 446.

Inverted subcarrier modulation signal 438 acts to subtract off the original subcarrier signal component 402 from data signal 411, while updated subcarrier modulation signal 446 remains on the updated optical data signal 451. Thus, an updated modulated optical data signal 451 is created that comprises original high data rate signal component 401 and updated subcarrier signal component 446. This updated signal 451 is then switched by OCCS 470 to the appropriate outbound fiber link 472 (shown in FIGS. 4A and 4B). Additional subcarrier modulation signals having different frequencies can also be added to the modulated optical data signal using FDM techniques (described in detail below) through the use of the drop/insert facility 407.

d. General Operation of the Invention

Figure 5:
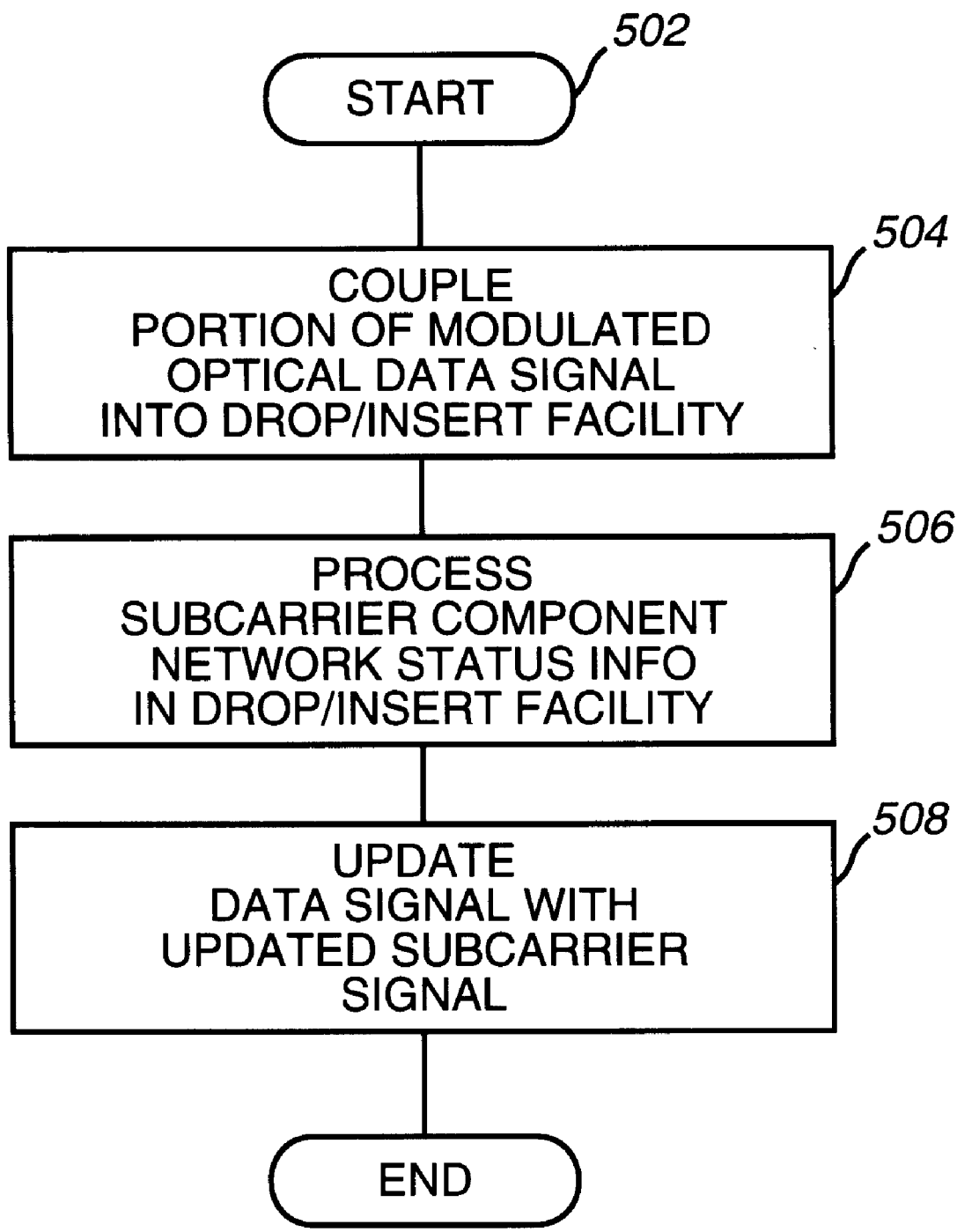
FIG. 5 is a flow chart of the operation of an optical network with a drop/insert facility, according to an embodiment of the invention.

FIG. 5 is a flow chart of the general operations performed using the present invention. As a modulated optical data signal 403 travels along a fiber link, a portion of the signal is coupled (step 504) into a drop/insert facility 407. The drop insert facility 407 processes (step 506) the coupled portion of the modulated data signal to produce an updated subcarrier modulation signal 446. The modulated optical data signal is updated (step 508) by an optical amplifier 450 which is driven by a bias current containing the updated subcarrier signal.

Figure 6:
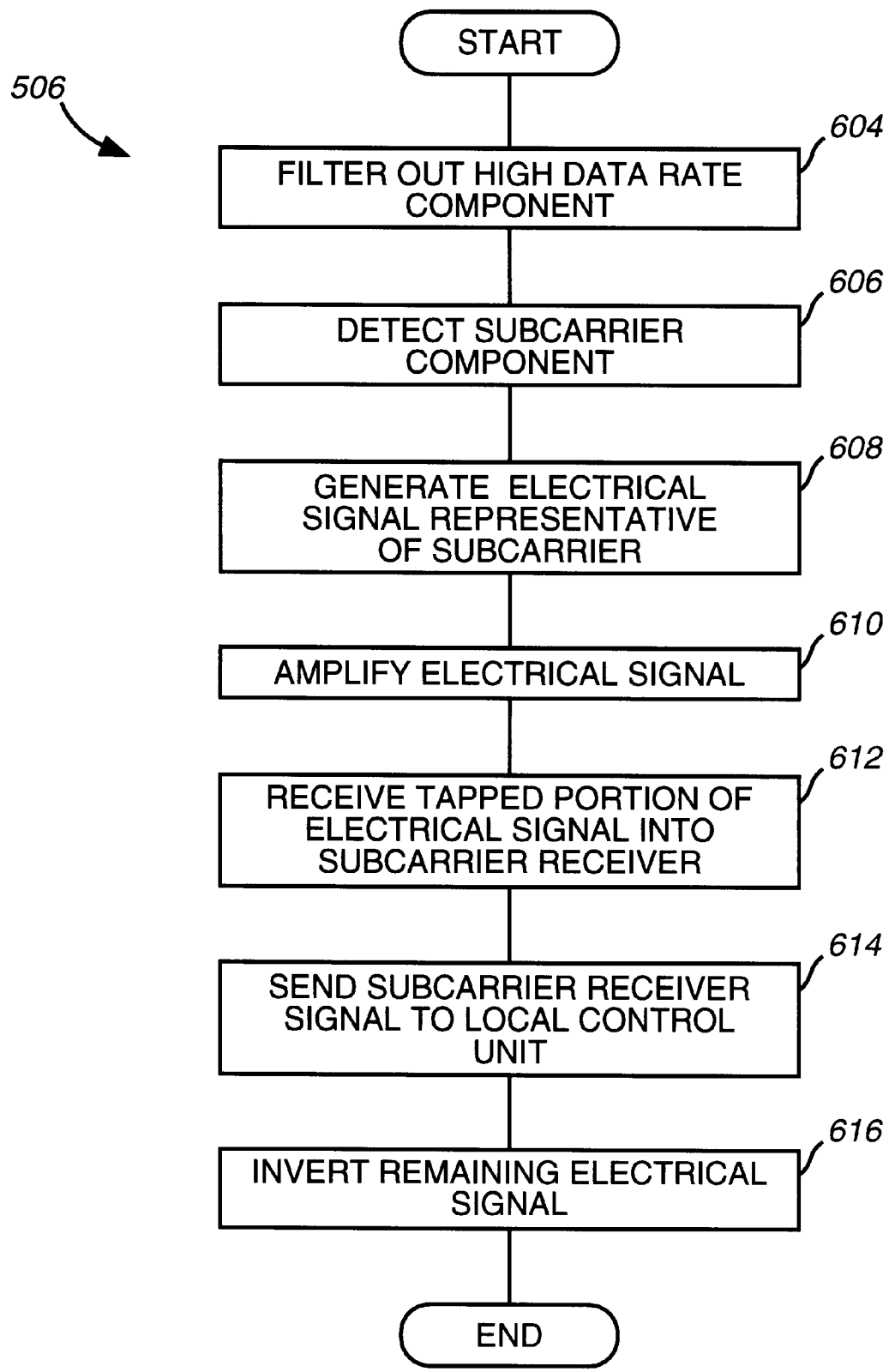
FIG. 6 is a flow chart detailing the processing operation of the drop/insert facility.

FIG. 6 is a detailed flow chart of the processing step (step 506) from FIG. 5. The coupled portion 409 of the modulated optical data signal is filtered (step 604) to remove the high frequency (high data rate) component of the modulated optical signal, leaving only the subcarrier component which is detected (step 606) in the drop/insert facility 407. An electronic signal representing the subcarrier component of the data signal is generated (step 608), then amplified (step 610). A portion of the subcarrier electrical signal is tapped (step 612) into a subcarrier receiver 422 and relayed (step 614) to the local control unit 430 of the drop/insert facility 407. The remaining portion of the subcarrier electrical signal can be inverted (step 616) to be used in subtracting out the original subcarrier component 402 of the modulated optical data signal 403 in the updating step (step 508). However, as described in the optical path trace section, alternative network applications utilize the original subcarrier component of the modulated optical data signal. Thus, this inversion step 616 need not always be performed.

Figure 7:
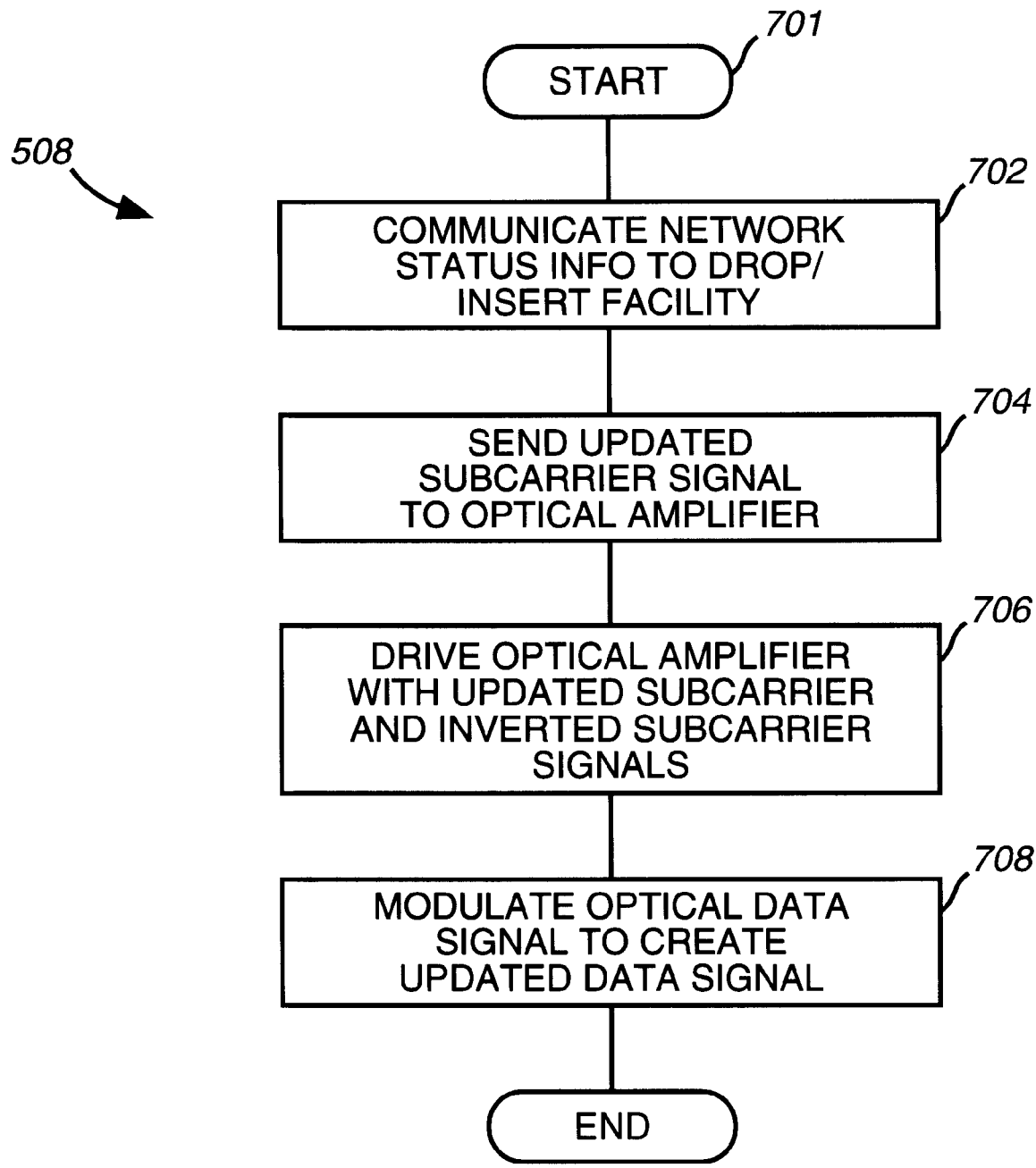
FIG. 7 is a flow chart detailing the updating operation according to an embodiment of the present invention.

FIG. 7 is a detailed flow chart of the updating step (step 508) from FIG. 5. Network status information can be communicated (step 702) to the local control unit 430 by the network management system facility 460. This ancillary network data is converted to an updated subcarrier modulation signal 446 and sent (step 704) to an optical amplifier 450 which amplifies the modulated optical data signal. The optical amplifier 450 is driven (step 706) by a bias current comprising the inverted subcarrier modulation signal 438 (from step 616) and the updated subcarrier modulation signal 446 (from step 704), thereby re-modulating (step 708) the optical data signal. The end result is an updated optical data signal 451 which can be switched later by an optical switching site to an appropriate outbound link.

Figure 8:
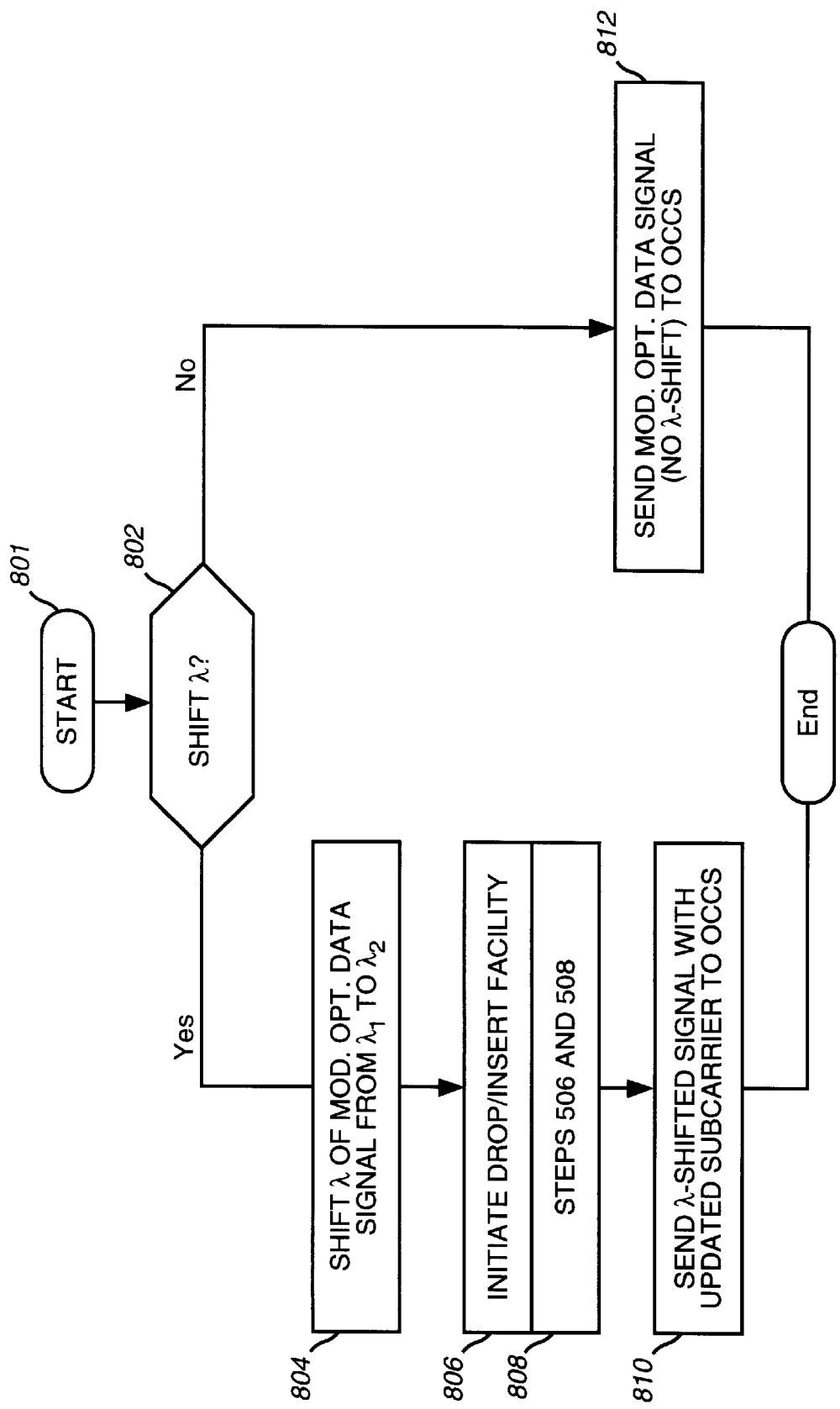
FIG. 8 is a flow chart detailing the wavelength shifting operation according to an embodiment of the present invention.

FIG. 8 is a flowchart detailing the operation of the invention in the situation where the wavelength of the modulated optical data signal needs to be shifted. If a command is sent from the network management system facility 460 indicating that a wavelength shift of the inbound modulated optical data signal is necessary (step 802, decision=yes), then the wavelength shifter 431 is activated to shift the wavelength of the inbound modulated optical data signal 403 (step 804). Additionally, the network management system facility 460 initiates the drop/insert facility 407 (step 806) to perform its processing and updating steps (step 808, corresponding to steps 506 and 508). Eventually, a wavelength shifted optical data signal 451 is sent to the OCCS 470 with an updated subcarrier signal (step 810). Typically, though, the wavelength shifter operates in a default mode, where the wavelength of an inbound data signal will is not shifted (step 802, decision=no), and the non-wavelength-shifted signal continues to the OCCS 470 (step 812).

e. Optical Path Trace
  (i) FDM Technique

A further embodiment of the present invention is the use of a series of drop/insert facilities located at various sites throughout the network to provide network management with the entire network picture of each link. Thus, the present invention can provide an optical path trace for modulated optical data signals traveling through a network. By utilizing a cumulative subcarrier modulation scheme, this optical path trace function can be performed without having to demodulate the high data rate signal and alter its transport overhead.

As described above, one method of introducing a network management monitoring mechanism is to add a low level subcarrier modulation signal to an optical carrier at a transmission site and detect it at a switching node or a final destination. In this embodiment of the present invention, the cumulative path of the modulated optical data signal is encoded onto the optical carrier signal by successive drop/insert facilities, such as drop/insert facility 407 shown in FIG. 4C, located at each network element that the modulated optical data signal passes through.

Figure 9A:
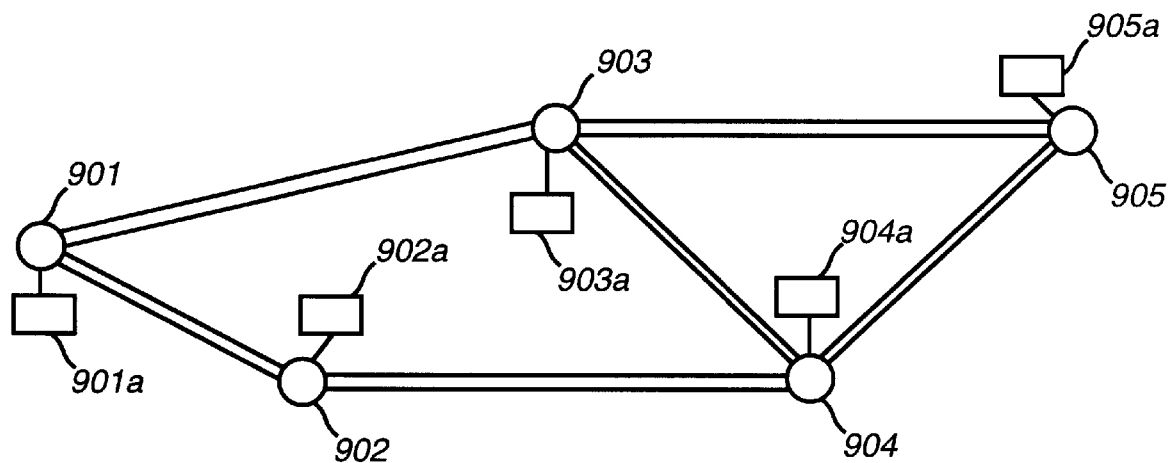
FIG. 9A is a block diagram of a communication network containing a drop/insert facility at each network site.

For example, FIG. 9A shows a block diagram of an optical communication network, similar to that shown in FIG. 1. The network includes five sites 901–905. Sites 901–905 can be switching nodes or other types of network equipment. In this embodiment of the present invention, sites 901–905 include drop/insert facilities 901a–905a, each similar to the drop/insert facility 407 from FIG. 4C. Further, each drop/insert facility 901a–905a is implemented to place a unique network element identifier tag onto an optical carrier signal passing through that site. For example, drop/insert facility 903a is implemented to place a subcarrier modulation signal indicating that specific network location onto a modulated optical carrier signal that passes through site 903. However, instead of utilizing an inverted subcarrier modulation signal, such as signal 438 from FIG. 4C, to subtract off the certain portions of the original subcarrier modulation signal (e.g., signal 402), drop/insert facilities 901a–905a can place the unique network element identifier tag information onto the modulated optical data signal in a cumulative manner, without erasing or altering the original subcarrier signal content. This cumulative form of updating the modulated optical data signal can be accomplished in different manners.

One method of creating an updated subcarrier modulation signal having cumulative path information as a rider on a high data rate modulated optical data signal is through a frequency division multiplexing (FDM) technique. For a discussion of FDM techniques, see D. Minoli, *Telecommunications Technology Handbook*, Artech House, Inc., U.S.A. (1991), chapter 3, and especially pages 104–105 (incorporated herein by reference).

Recall that a subcarrier modulation signal is of a much lower frequency (e.g., 1 KHz to 10 MHz) than the high data rate signal component (1–10 GHz) of the modulated optical data signal. In this embodiment of the present invention, the subcarrier modulation signal utilized by the network is broken down into separate frequency components.

Figure 9B:
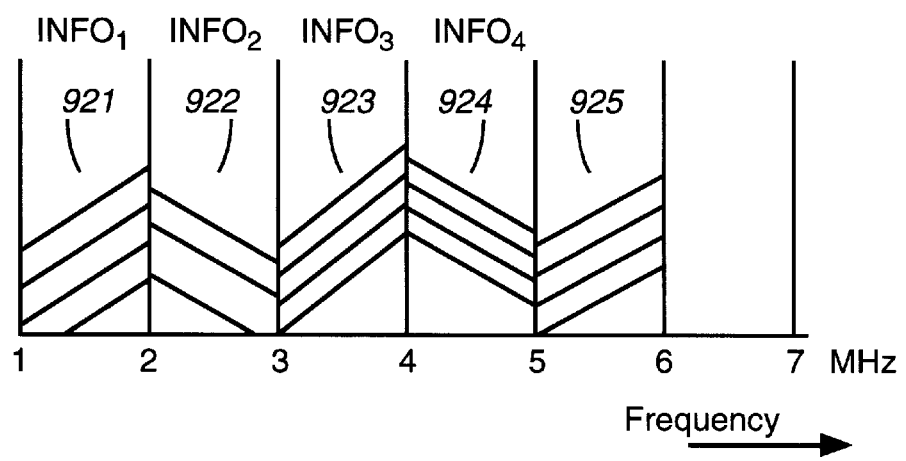
FIG. 9B is a diagram of an example frequency spectrum of a subcarrier modulation signal.

FIG. 9B shows a schematic diagram of the frequency spectrum of an example subcarrier signal. Sites 901–905 are each represented by a different frequency region of the subcarrier modulation signal spectrum. For example, site 901 is allotted the frequency range 921, which extends from 1 MHz to 2 MHz. Similarly, site 902 is allotted the frequency range 922, which extends from 2 MHz to 3 MHz. These frequency ranges 921–925 are also referred to as subcarrier modulation bands (or FDM slots). In addition, these FDM slots may be any number of different frequency ranges, depending on the detection equipment used at the receive end. In addition, these FDM slots should be spaced apart in order to avoid information overlap.

Thus, at drop/insert facility 901 a, an updated subcarrier modulation signal containing ancillary network data (including the unique network element identifier tag for site 901) can be superimposed onto a modulated optical data signal passing through site 901 at a modulation frequency of between 1 MHz to 2 MHz (ie., FDM slot 921). The unique network element identifier tag is either embedded into the logic of the local control unit of the drop/insert facility, such as local control unit 430, or supplied by network management, such as network management system 460.

Then, as the modulated optical data signal passes through site 902, the subcarrier modulation signal is further updated as drop/insert facility 902a overwrites (or superimposes) its own unique network identifier information onto the subcarrier modulation signal at a different FDM slot, in this case FDM slot 922. Further, a destination site, such as site 905, also includes detection equipment (not shown), well known to those skilled in the art, that detect selective subcarrier frequency bands and demodulate the subcarrier signal in that band. Thus, by the time the modulated optical data signal reaches its final destination, the subcarrier modulation signal includes the unique network identifiers from each network element the modulated optical data signal passes through, providing network management with a non-invasive, optical form of path monitoring.

The specific manner in which a drop/insert facility superimposes ancillary network information onto a modulated optical data signal in this embodiment of the present invention is similar to that described above in connection with FIGS. 4A–4C. In this embodiment, a drop/insert facility, such as drop/insert facility 407, receives a coupled portion of a modulated optical data signal 403, such as modulated optical data signal 403. Drop/insert facility 407 processes the coupled portion of the modulated optical data signal to produce a FDM added, updated subcarrier signal containing prior path history.

In particular, the inverter unit of the drop/insert facility, such as inverter 436, is deactivated, so that the original subcarrier signal, generated at site 901, and contained in FDM slot 921, for example, is not subtracted off during optical amplification, such as by optical amplifier 450. As the modulated optical data signal travels through site 902, drop/insert facility 902a generates a subcarrier modulation signal including the unique network element identifier information corresponding to site 902. Note that the information content of the subcarrier signal generated at drop/insert facility 902a can include any ancillary network information, such as discussed above in the example environment section.

A new subcarrier transmitter, such as new subcarrier transmitter 445, generates a signal corresponding to the specific FDM slot of site 902, such as FDM slot 922. The frequency of this subcarrier signal can be combined with the original subcarrier modulation signal, to form the bias current for the optical amplifier which amplifies the modulated optical data signal. The modulated optical data signal traveling to site 904, for example, would contain path specific ancillary information contained in both FDM slot 921 and FDM slot 922. Further, other signal monitoring functions can utilize this non-invasive FDM technique. For example, optical carrier signal wavelength can also be communicated as part of each FDM slot, which allows end-to-end wavelength trace. Thus, in this embodiment of the present invention, the original subcarrier modulation signal need not be canceled out by the drop/insert facility.

Further, in this embodiment of the present invention, it is not required that the drop/insert facility, such as drop/insert facility 902a, perform its "drop" function at all. In certain situations, it may be required that drop/insert facility 902a perform only its "insert" function.

For example, a modulated optical data signal originates at site 901, with the signal's ancillary network data located in FDM slot 921. The modulated optical data signal travels through site 902, where the local control unit of drop/insert facility 902a can instruct facility 902a to only generate a new subcarrier modulation signal (corresponding to FDM slot 922). The new subcarrier transmitter located at facility 902a generates a subcarrier signal corresponding to FDM slot 922, which forms the bias current driving an optical amplifier. The resulting modulated optical data signal emerging from site 902 will have ancillary network data located at both FDM slot 921 and FDM slot 922. Thus, in this embodiment of the present invention, drop/insert facility 902a can tag ancillary network data onto the modulated optical data signal without having to process a coupled portion of the inbound modulated optical data signal from site 901.

As described above, one method of providing optical path trace functionality to a communication network is to assign a portion of the subcarrier frequency spectrum to each individual site or node in the network. Hence, a drop/insert facility located at each site injects its own characteristic subcarrier modulation signal into an assigned subcarrier modulation band. Alternatively, according to the present invention, the updating of modulated optical data signals can also be accomplished by assigning each node or site a unique waveform that is encoded onto the modulated optical data signal passing through that site without altering or interfering with the high data rate signal. This technique is refered to as Code Division Multiple Access (CDMA). See e.g., P. Green, *Fiber Optic Networks*, Prentice-Hall, Chapter 13 (1993) (incorporated by reference herein in its entirety).

While CDMA technology is generally understood in terms of a wireless communication environment, it can also be implemented in a fiber communication environment. For example, at a given site in a network, a drop/insert facility, such as drop/insert facility 902a, is implemented with a subcarrier signal generator, such as new subcarrier transmitter 445 in FIG. 4C, that generates a subcarrier signal with its own unique code. Similar to that described above, this subcarrier modulation signal is of a lower amplitude than the high data rate signal. This unique subcarrier modulation signal is spread across the subcarrier frequency spectrum (1 KHz to 10 MHz) of the modulated optical data signal. At a destination site, detection equipment, such as CDMA detection equipment, pull the unique codes corresponding to each network site from the modulated optical data signal. Thus, the path history of a modulated optical data signal, as well as other types of network monitoring, can be accomplished by implementing a network drop/insert facility with CDMA compatible equipment.

(ii) Appending to the End of a Data Burst

Additionally, the present invention can provide an optical path trace function when data signals traveling the network are sent in bursts, rather than in continuous data streams. In this embodiment of the present invention, each drop/insert facility appends bits of ancillary network data, such as its path identifier, to the end of a data signal burst. By the time a data signal reaches its final destination, each site with a drop/insert facility has added its unique network element identifier tag to the end of the data burst. For situations where the initial subcarrier signal contains network information such as the length of the data burst, the drop/insert facility superimposes an updated subcarrier modulation signal with the correct signal length information. Again, optical path trace functionality is achieved at a destination site by decoding appended information to the data signal burst, providing a complete end-to-end history of that link. Various methods of decoding the appended data are well known to those of skill in the art.

f. Remote Applications

In addition to being located proximate to an optical cross-connect switch site, alternative environments may also utilize the present invention. For example, it may be necessary to employ a drop/insert facility along underwater communications lines. Both fiber optic and electrical cables contain intermediate amplifier stages buried under the sea. These amplifier stages may require the ability to send a subcarrier signal. This is possible with the present invention because the drop/insert facility 407 can be located at any place along a fiber link and can be controlled on a local level by local control unit 430. Additionally, with land based communications links reaching several hundred kilometers in length, it may be desirable from a network management context to transmit and receive a subcarrier signal at each one of these regenerative stages to convey, for example, alarm information and signal quality information that tends to vary over long distances.

5. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

We claim:

1. A method for updating a modulated optical data signal in a communication network, wherein the modulated optical data signal comprises a high data rate modulation signal and a subcarrier modulation signal, and wherein the communication network includes first and second sites connected by a first fiber link carrying the modulated optical data signal between the first and second sites, the method comprising the steps of:

(1) coupling a portion of the modulated optical data signal from the first fiber link into a drop/insert facility;

(2) processing the coupled portion of the modulated optical data signal; and (3) updating the modulated optical data signal from the first fiber link using the processed coupled portion of the modulated optical data signal to create an updated optical signal.

2. The method according to claim 1, wherein step (2) comprises the steps of:

(a) filtering out the high data rate modulation signal from said coupled portion of the modulated optical data signal so that only the subcarrier modulation signal of said coupled portion of the modulated optical data signal remains;

(b) detecting the subcarrier modulation signal of said coupled portion of the modulated optical data signal from the first fiber link;

(c) generating a first electrical signal representative of said detected subcarrier modulation signal of said coupled portion of the modulated optical data signal;

(d) amplifying said first electrical signal;

(e) coupling a portion of said amplified first electrical signal into a subcarrier receiver;

(f) sending said coupled portion of said amplified first electrical signal to a data receive buffer; and (g) inverting a remainder of said amplified first electrical signal to create an inverted electrical signal representation of the subcarrier modulation signal of said coupled portion of the optical signal from the first fiber link.

3. The method according to claim 1, wherein step (3) comprises the steps of:

(a) placing updated signal status information of the modulated optical data signal from the first fiber link onto a data transmit buffer;

(b) sending said updated signal status information to a new subcarrier transmitter, wherein said new subcarrier transmitter creates an electrical representation of an updated subcarrier modulation signal of the modulated optical data signal from the first fiber link;

(c) driving optical amplifier means with said electrical representation of said updated subcarrier modulation signal and said inverted electrical signal representation of the subcarrier modulation signal; and (d) modulating a remaining portion of the modulated optical data signal from the first fiber link with said optical amplifier means, wherein the subcarrier modulation signal is subtracted from the modulated optical data signal from the first fiber link by said inverted subcarrier signal and said updated subcarrier modulation signal is superimposed onto the modulated optical data signal from the first fiber link thereby creating an updated modulated optical data signal.

4. The method according to claim 1, wherein the second site further includes an intermediate optical cross-connect switch for optically coupling the modulated optical data signal between the first fiber link to a second fiber link, wherein said drop insert facility is located proximate to said intermediate optical cross-connect switch, and wherein said updated optical signal is directed to said intermediate optical cross-connect switch.

5. The method according to claim 3, wherein step (3) further comprises the step of:

(e) communicating network signal status information between a network management system and a local control unit of said drop/insert facility.

6. The method according to claim 1, wherein the wavelength of the modulated optical data signal is $\lambda_1$, further comprising the steps of:

(4) shifting the wavelength ($\lambda_1$) of the modulated optical data signal prior to step (3);

(5) communicating a new wavelength status of the modulated optical data signal to said network management system; and (6) including said new wavelength status in said updated network signal status information to be superimposed onto the modulated optical data signal.

7. The method according to claim 1, wherein the subcarrier modulation signal comprises a plurality of subcarrier modulation bands (FDM slots), wherein a first FDM slot includes ancillary network data generated at the first site and corresponds to a first subcarrier frequency, wherein step (2) comprises the steps of:

(a) filtering out the high data rate modulation signal from said coupled portion of the modulated optical data signal so that only the subcarrier modulation signal of said coupled portion of the modulated optical data signal remains;

(b) detecting the subcarrier modulation signal of said coupled portion of the modulated optical data signal from the first fiber link;

(c) generating an electrical signal representative of the detected subcarrier modulation signal of said coupled portion of the modulated optical data signal;

(d) amplifying said electrical signal;

(e) coupling a portion of said amplified electrical signal into a subcarrier receiver;

(f) sending said coupled portion of said amplified electrical signal to a data receive buffer; and (g) generating a second subcarrier signal at a second subcarrier frequency, wherein said second subcarrier signal includes ancillary network data including a unique network element identifier corresponding to the second site.

8. The method according to claim 7, wherein step (3) comprises the steps of:

(a) placing said second subcarrier signal onto a data transmit buffer, wherein said second subcarrier frequency corresponds to a second FDM slot of the subcarrier signal;

(b) sending said second subcarrier signal to a new subcarrier transmitter, wherein said new subcarrier transmitter creates an electrical representation of said second subcarrier signal;

(c) driving optical amplifier means with said electrical representation of said second subcarrier signal and said amplified first electrical signal; and (d) modulating a remaining portion of the modulated optical data signal from the first fiber link with said optical amplifier means to create an updated modulated optical data signal, wherein said updated subcarrier modulation signal is superimposed onto the modulated optical data signal from the first fiber link thereby, and wherein said updated modulated optical data signal includes ancillary network data in said first FDM slot and said second FDM slot of the subcarrier signal.

9. A method for creating a modulated optical data signal in a communication network with current ancillary network information, wherein the modulated optical data signal comprises a high data rate modulation signal and a subcarrier modulation signal, wherein the communication network includes a plurality of sites connected by a plurality of fiber links, wherein a first site and a second site are connected by a first fiber link, wherein the subcarrier modulation signal comprises a plurality of subcarrier modulation bands (FDM slots), wherein a first FDM slot corresponds to ancillary network data input at a first subcarrier frequency at the first site, the method comprising the steps of:

(1) sending the modulated optical data signal along the first fiber link;

(2) generating a second subcarrier modulation signal at a second subcarrier frequency at the second site, wherein said second subcarrier modulation signal corresponds to a second FDM slot of the subcarrier modulation signal; and (3) updating the modulated optical data signal at said second site.

10. The method according to claim 9, wherein step (3) comprises the steps of:

(a) sending ancillary network data to a new subcarrier transmitter located at the second site, wherein said ancillary network data includes a unique network element identifier corresponding to the second site and the second FDM slot of the subcarrier signal, and wherein said new subcarrier transmitter creates an electrical representation modulated at said second subcarrier frequency corresponding to said second FDM slot of the subcarrier signal;

(b) driving an optical amplifier with said electrical representation; and (c) modulating the modulated optical data signal from the first fiber link with said optical amplifier to create an updated modulated optical data signal, wherein said second subcarrier signal is superimposed onto the modulated optical data signal from the first fiber link, and wherein said updated modulated optical data signal includes ancillary network data in said first FDM slot and said second FDM slot of the subcarrier signal.

11. The method according to claim 10, wherein the network includes a destination site, further comprising the steps of:

(4) receiving the updated modulated optical data signal at the destination site; and (5) separately detecting the first and second FDM slots of the subcarrier signal to provide a path history of the modulated optical data signal.

12. A drop/insert facility apparatus for updating a modulated optical data signal in a communication network, wherein the modulated optical data signal comprises a high data rate signal and a subcarrier signal, and wherein the communication network includes first and second sites connected by a first fiber link carrying the modulated optical data signal between the first and second sites, comprising:

means for processing the subcarrier signal information, wherein the drop/insert facility receives a coupled portion of the modulated optical data signal;

means for updating the subcarrier signal information, an optical coupler, to couple said portion of the modulated optical data signal;

optical processor means, processing the subcarrier modulation signal of said coupled portion of the modulated optical data signal, to generate a first electrical signal representative of the subcarrier modulation signal of said coupled portion of the modulated optical data signal;

an amplifier, coupled to said optical processor means, to amplify said first electrical signal;

a subcarrier receiver to receive a tapped portion of said amplified first electrical signal;

a subcarrier signal error counter coupled to said subcarrier receiver;

an inverter, receiving a remaining portion of said amplified first electrical signal, to create an inverted electrical signal representation of the subcarrier modulation signal of the modulated optical data signal from the first fiber link;

a local control unit, in electrical communication with said subcarrier receiver said local control unit, including a data receive buffer to receive subcarrier information from said subcarrier receiver, a data transmit buffer to send data relayed by said local control unit, and a processor to process subcarrier information received by said data receive buffer, wherein said local control unit places updated signal status information of the modulated optical data signal from the first fiber link onto said data transmit buffer; and a new subcarrier transmitter in electrical communication with said data transmit buffer to generate a new subcarrier modulation signal.

13. The apparatus according to claim 12, further comprising:

optical amplifier means, receiving said new subcarrier modulation signal and said inverted subcarrier signal, to optically amplify the modulated optical data signal from the first fiber link.

14. The apparatus according to claim 12, wherein said optical amplifying means is either a semiconductor amplifier or an erbium doped fiber amplifier.

15. The apparatus according to claim 12, wherein the second site further includes an intermediate optical cross-connect switch for optically coupling the modulated optical data signal from the first fiber link to a second fiber link, further comprising:

a network management system in electronic communication with the first and second sites, said intermediate optical cross-connect switch, and the drop/insert facility to communicate network signal status information.

16. The apparatus according to claim 12, wherein the wavelength of the modulated optical data signal is $\lambda_1$, further comprising:

a wavelength shifter, in electronic communication with said network management system and the drop/insert facility, and optically coupled to the first fiber link, to shift said wavelength of the modulated optical data signal.

17. The apparatus according to claim 12, wherein the high data rate modulation signal is a SONET signal.

18. The apparatus according to claim 12, wherein said optical processor means comprises:

a filter for filtering the first electrical signal to substantially recover the subcarrier modulation signal of the modulated optical data signal; and a detector for detecting the presence or absence of a recovered subcarrier modulation signal after said filtering.

19. The apparatus according to claim 12, wherein the subcarrier modulation signal has a frequency and amplitude lower than the high data rate signal of the modulated optical data signal.

20. The apparatus according to claim 12, wherein said drop/insert facility is located along an underwater communications optical fiber link.

21. The apparatus of claim 12, wherein the subcarrier modulation signal comprises a plurality of subcarrier modulation bands (FDM slots), wherein a first FDM slot includes ancillary network data generated at the first site and corresponds to a first subcarrier frequency, wherein said inverter is deactivated and passes said amplified first electrical signal, wherein said updated signal status information includes a unique network element identifier corresponding to the second site, and wherein said subcarrier transmitter generates a new subcarrier modulation signal at a second subcarrier frequency that corresponds to a second FDM slot of the subcarrier signal.

22. The apparatus of claim 21, further comprising:

optical amplifier means, receiving said new subcarrier signal at said second subcarrier modulation frequency and receiving said amplified first electrical signal at said first subcarrier modulation frequency, to optically amplify the modulated optical data signal from the first fiber link.

23. A system for updating a modulated optical data signal, wherein the modulated optical data signal comprises a high data rate signal and a subcarrier signal, comprising:

a communication network to facilitate transport of the modulated optical data signal, wherein said network includes first and second sites connected by a first fiber link carrying the modulated optical data signal between said first and second sites; and a drop/insert facility to receive a coupled portion of the modulated optical data signal and to process and update subcarrier signal information, said drop/insert facility including an optical coupler, to couple said portion of the modulated optical data signal;

optical processor means, receiving the subcarrier modulation signal of said coupled portion of the modulated optical data signal, to generate an electrical signal representative of the subcarrier modulation signal of said coupled portion of the modulated optical data signal;

an amplifier to amplify said electrical signal;

a subcarrier receiver to receive a tapped portion of said amplified electrical signal;

an inverter, receiving a remaining portion of said amplified electrical signal, to create an inverted electrical signal representation of the subcarrier modulation signal of the modulated optical data signal from said first fiber link;

a local control unit, in electrical communication with said subcarrier receiver said local control unit comprising a data receive buffer to receive subcarrier information from said subcarrier receiver, a data transmit buffer to send data relayed by said local control unit, and a processor to process subcarrier information received by said data receive buffer, wherein said local control unit places updated signal status information of the modulated optical data signal from said first fiber link onto said data transmit buffer; and a new subcarrier transmitter in electrical communication with said data transmit buffer to generate a new subcarrier signal.

24. The system according to claim 23, further comprising: optical amplifier means, receiving said new subcarrier signal and said inverted subcarrier signal, to optically amplify the modulated optical data signal from said first fiber link.

25. The system according to claim 24, wherein said second site further includes an intermediate optical cross-connect switch for optically coupling the modulated optical data signal between said first fiber link to a second fiber link, further comprising:

a network management system in electronic communication with said first and second sites, said intermediate optical cross-connect switch, and said drop/insert facility to communicate network signal status information.

26. The system according to claim 25, wherein the wavelength of the modulated optical data signal is $\lambda_1$, further comprising:

a wavelength shifter, in electronic communication with said network management system and said drop/insert facility, and optically coupled to said first fiber link, to shift said wavelength of the modulated optical data signal.

27. The system according to claim 25, wherein the high data rate modulation signal is a SONET signal.

28. The system according to claim 24, wherein said optical amplifying means is either a semiconductor amplifier or an erbium doped fiber amplifier.

29. The system according to claim 23, wherein said optical processor means comprises:

a filter for filtering the first electrical signal to substantially recover the subcarrier modulation signal of the modulated optical data signal; and a detector for detecting the presence or absence of a recovered subcarrier modulation signal after said filtering.

30. The system according to claim 23, wherein the subcarrier modulation signal has a frequency and amplitude lower than the high data rate signal of the modulated optical data signal.

31. The system according to claim 23, wherein the modulated optical data signal is transmitted from said first site to said second site in a series of data bursts, and wherein said local control unit generates an updated subcarrier signal including a unique network element identifier corresponding to said second site, to be appended to the end of the data burst.

32. A system for updating a modulated optical data signal to provide an optical path trace, wherein the modulated optical data signal comprises a high data rate signal and a subcarrier signal, comprising:

a communication network to facilitate transport of the modulated optical data signal, wherein said network includes a plurality of network element sites connected by a plurality of fiber links carrying the modulated optical data signal between said sites; and a plurality of drop/insert facilities, wherein at least one drop/insert facilities is located at each of said plurality of sites, to update the subcarrier signal information of the modulated optical data signal, wherein each of said plurality of drop/insert facilities generates a unique network element identifier, wherein said, unique network element identifier corresponds to a separate modulation section (FDM slot) of the subcarrier modulation signal, and wherein each FDM slot corresponds to a redetermined subarrier modulation frequency.

33. The system of claim 32, wherein said plurality of sites includes a first site and a second site, wherein said first site includes a first drop/insert facility and said second site includes a second drop/insert facility, wherein said first drop/insert facility places ancillary network data corresponding to said first site into a first FDM slot of the subcarrier signal and said second drop/insert facility places updated ancillary network data corresponding to said second site into a second FDM slot of the subcarrier signal.

34. The system of claim 32, wherein said plurality of sites further includes a destination site for the modulated optical data signal, wherein said destination site comprises:

a subcarrier modulation signal detector, to receive the subcarrier signal of the modulated optical data signal, wherein said subcarrier modulation signal detector detects said first FDM slot of the received subcarrier signal and said second FDM slot of the received subcarrier signal and demodulates the subcarrier signal at said first subcarrier frequency and said second subcarrier frequency.

35. A system for updating a modulated optical data signal to provide an optical path trace, wherein the modulated optical data signal comprises a high data rate signal and a subcarrier signal, comprising:

a communication network to facilitate transport of the modulated optical data signal, wherein said network includes a plurality of network element sites connected by a plurality of fiber links carrying the modulated optical data signal between said sites; and a plurality of drop/insert facilities, wherein at least one drop/insert facility is located at watch of said plurality of sites to update the subcarrier signal information of the modulated optical data signal, wherein each of said plurality of drop/insert facilities generates a unique network element identifier, wherein said unique network element identifier corresponds to a subcarrier modulation signal waveform, wherein said plurality of sites includes a first site and a second site, wherein said first site includes a first drop/insert facility and said second site includes a second drop/insert facility, wherein said first drop/insert facility generates and encodes a first subcarrier waveform on a subcarrier modulation spectrum of the modulated optical data signal, wherein said second drop/insert facility generates and encodes a second subcarrier waveform on said subcarrier plurality of sites further includes a destination, site for the modulated optical data signal.

36. The system of claim 35, wherein said destination site comprises:

a Code Division Multiple Access (CDMA) detector to receive the subcarrier signal of the modulated optical data signal, wherein said CDMA detector detects said first subcarrier waveform and said second subcarrier waveform.

* * * * *